United States Patent [19]

Sieving

[11] 3,913,705
[45] Oct. 21, 1975

[54] ENGINE EXHAUST SYSTEM
[75] Inventor: Alfred William Sieving, Decatur, Ill.
[73] Assignee: Caterpillar Tractor Co., Peoria, Ill.
[22] Filed: Nov. 21, 1974
[21] Appl. No.: 525,797

[52] U.S. Cl.............. 181/36 D; 180/64 A; 181/49; 181/61; 280/432; 296/28 C
[51] Int. Cl.² .................. F01N 3/06; B60K 1/00
[58] Field of Search................ 180/64 A; 280/432; 296/28 C; 298/1 H; 181/36 R, 36 D, 49, 53, 61

[56] References Cited
UNITED STATES PATENTS

| | | | |
|---|---|---|---|
| 2,974,997 | 3/1961 | Parsley et al. | 296/28 |
| 3,134,628 | 5/1964 | Lackey et al. | 180/64 A X |
| 3,163,251 | 12/1964 | Rees | 181/36 D UX |
| 3,695,708 | 10/1972 | Vincenty | 298/1 H |
| 3,763,950 | 10/1973 | Rockwell | 180/64 A |
| 3,834,752 | 9/1974 | Cook et al. | 180/64 A X |

Primary Examiner—Joseph W. Hartary
Assistant Examiner—John F. Gonzales
Attorney, Agent, or Firm—Ralph E. Walters

[57] ABSTRACT

An exhaust system for a tractor-trailer vehicle makes use of a chambered box-like portion forming part of a turn-stop assembly carried by the chassis of said vehicle. The box-like portion has a closed chamber which contains baffles and serves as a muffler for exhaust gases admitted thereto from the engine of the vehicle. The exhaust gases are expelled from an exhaust stack communicating with said closed chamber.

10 Claims, 3 Drawing Figures

ENGINE EXHAUST SYSTEM

BACKGROUND OF THE INVENTION

1. Field of the Invention

This invention relates to exhaust systems for vehicles and, more particularly, to an improved exhaust system for a tractor-trailer-type vehicle having a chambered turn-stop assembly.

2. Description of the Prior Art

In dump-type vehicles, different systems are used for conveying the exhaust gases from the engine to the rear end of the vehicle. These systems sometimes entail separate exhaust pipes, mufflers, resonators, and the like, which culminate in a tail pipe generally projecting rearwardly or sidewardly from the tail end of the vehicle. Some dump truck arrangements make use of the dump body to receive the exhaust gases so as to extract the heat from the exhaust gases for heating the dump body for a particular purpose. In the heated dump-type of vehicle, the exhaust gases are piped into chambers built into the walls and bottom of the dump body so that the exhaust gases move through the chambers as the exhaust gases give up heat to the dump body.

In another version of the prior art, the exhaust system is connected to the dump body in such a way that a portion of the exhaust system moves with the dump body as the dump body is raised to discharge its load. In this way, the extremities of the exhaust system are not broken off each time the dump body is raised or lowered.

In tractor-trailer-type vehicles, it is necessary to provide a vertical exhaust system and stack near the side of the cab which is not only expensive, but also obstructs the rearward vision of the vehicle's driver.

In a recently filed application assigned to the common assignee of the present application, a disclosure was made of a means for converting a dump truck vehicle to a tractor-trailer-type vehicle by removably attaching to the chassis of the vehicle a hitch assembly and a turn-stop assembly. In the disclosed dump truck to tractor-trailer, or the reverse, conversion arrangement, an exhaust system that is adequate and desirable for the vehicle when used as a dump truck is inadequate for the vehicle when used as a tractor-trailer. That is, when used as a tractor-trailer, it has been desirable and necessary to attach, rearward of the vehicle cab, an expensive and view obstructing vertically mounted exhaust muffler and exhaust stack arrangement.

SUMMARY OF THE INVENTION

In a tractor-trailer-type vehicle and, in particular, a dump truck vehicle converted to a tractor-trailer vehicle, a turn-stop assembly should be employed so as to prevent the trailer being towed from swinging around and striking the cab of the vehicle. The removable turn-stop assembly, as disclosed in the co-pending application referred to above, has been partially modified to become the muffler for the exhaust system of the vehicle.

Specifically, a box-like portion of the turn-stop assembly has a closed chamber which is provided with spaced and apertured baffles in the vicinity of the inlet opening in said chamber. Exhaust gases from the engine enter the inlet opening into said closed chamber and are muffled and cooled as a result of the baffling arrangement in the closed chamber. The gases are finally expelled from an exhaust stack which communicates with the closed chamber.

With the muffler arrangement built into the turn-stop assembly, a very heavy-duty muffler is provided since the plates forming the walls of the muffler are of a relatively heavy-gauge metal in order to serve their primary function of supporting the bumpers for the turn-stop assembly. With the muffler made of the heavy-gauge plates, less servicing of the exhaust system is required while a more effective sound deadening is produced. The heavy-gauge plates radiate the heat from the exhaust gases quite efficiently and are not subject to the relatively rapid corrosion deterioration normal in a muffler arrangement. The exhaust stack is positioned at a convenient location which is not likely to interfere with the rearward vision of the vehicle operator.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figures 1, 2, 3:
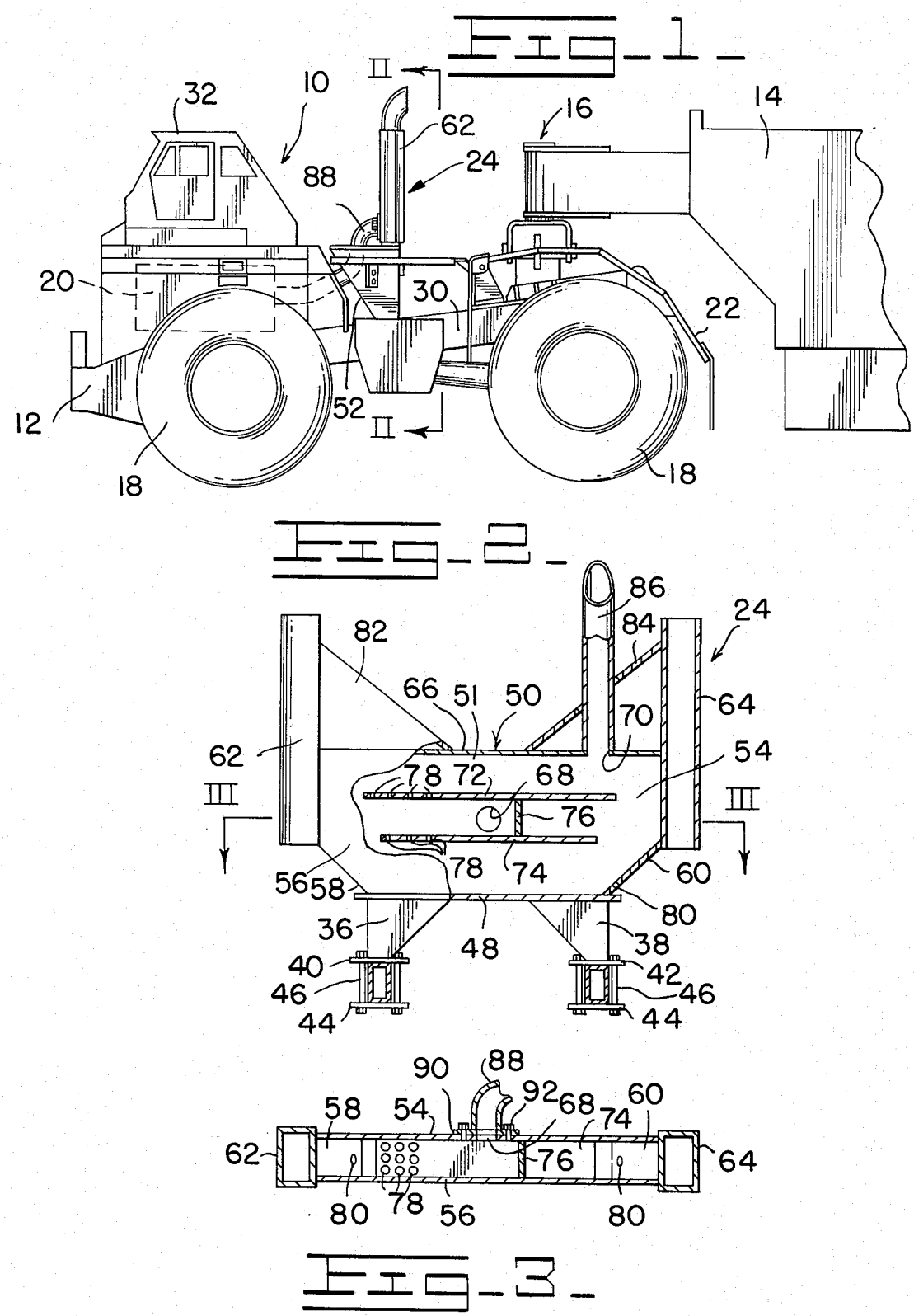
FIG. 1 is a partial elevational view of my improved chambered turn-stop assembly hooked into the exhaust system of a tractor-trailer-type vehicle.
FIG. 2 is a broken away, partial cross-sectional view taken along the lines 2—2 of FIG. 1.
FIG. 3 is a cross-sectional view taken along the lines 3—3 of FIG. 2.

Referring to the drawings and, in particular, to FIG. 1, a relatively large off-the-road or off-the-highway tractor-trailer-type vehicle 10 is illustrated and includes a tractor 12 for towing or hauling a semi-trailer-type vehicle 14 which is pivotally connected to the tractor by a vertically oriented hitch assembly 16. The tractor 12 has the usual pairs of wheels 18 which are driven in any one of the conventional manners by an engine 20. Appropriate fenders or mud guards 22 are provided for the rear wheels and a vertically oriented turn-stop assembly 24 is secured to the vehicle frame 30.

The turn-stop assembly 24 is mounted on the vehicle frame 30 in such a way as to protect the cab of the vehicle from bumps by the semitrailer body 14 in the event the trailer body swings too far about the vertical axis of the hitch 16, for instance, when the vehicle is making a sharp turn.

The turn-stop assembly 24 is fabricated from numerous, rather heavy-gauge plates and includes a pair of joined together box-like leg portions 36 and 38 welded onto a pair of spaced apart foot plates 40 and 42. The foot plates 40 and 42 are bolted to the frame of the vehicle by means of the tie plates 44 and bolts 46. The leg portions 36, 38 are connected to a plate 48 which is the top plate for the leg portions (FIG. 1) and is the bottom plate (FIG. 2) for a support structure 50. The leg portions 36, 38 have forward walls 52 sloping in such a way that each leg is wider at the top than at the bottom or foot plate connecting portion as viewed from the side in FIG. 1.

The support structure 50 has a chambered box-like portion 51 which is formed by a pair of spaced apart vertical plates or side walls 54,56 and a pair of angled end plates or walls 58,60 connected together and connected to the bottom plate 48. A pair of upwardly extending tubular bumpers or stop members 62,64 are disposed at the opposite ends of the box-like portion with a portion of the one wall of the bumpers or stop members forming the balance of the end walls 58,60 of the box-like portion. A top plate 66 is connected to the top of the walls 54,56 and to the bumpers 62,64 whereby a closed chamber is provided within said box-like portion. An inlet opening 68 is formed through the front wall 54 generally centrally thereof and an outlet opening 70 is formed through the top wall 66 generally close to bumper 64. Mounted between the side walls 54,56 of the box-like portion and positioned on opposite sides of said inlet opening 68 is a pair of spaced apart, substantially parallel baffle plates 72 and 74. A vertically oriented blocker plate 76 extends between the baffle plates 72,74 and between the side walls 54,56 and is located on the side of the inlet opening 68 nearest to the outlet opening 70 so as to block the most direct path between the inlet opening and the outlet opening in the chamber.

The baffle plates 72,74 have a plurality of openings 78 therethrough on the downstream side of the exhaust gas flow. That is, the openings 78 in the baffles 72,74 are located on the side of inlet opening 68 opposite to the side having the blocker plate 76. Suitable drain openings 80 are formed through the angled end plates 58,60 at or near the lowermost extremity thereof so as to permit the moisture or condensation from the exhaust gases to drain from the closed chamber or muffler interior.

A pair of angled support walls 82,84 extend between the box-like portion 51 and the upper extremity of the tubular bumpers or stop members 62,64 so as to provide suitable support for said bumpers or stop members. An exhaust stack 86 is connected to the top plate 66 on the bumper 64 side of the box-like portion 51 at an appropriate location with respect to the tractor cab 32 so as to provide the least interference to the rearward vision of the operator of the vehicle. The exhaust stack 86 passes through and is supported by the support wall 84. The stack communicates with the inside of the box-like portion through outlet opening 70 which opening is spaced from the inlet opening 68. An exhaust pipe 88 is connected to the exhaust manifold of the engine 20 and has a flange 90 formed around the one end thereof so that the pipe can be secured by appropriate fasteners 92 to the front wall 54 of the turn-stop assembly with the opening in the pipe communicating with the inlet opening 68 into the chamber in the box-like portion 51.

The exhaust gases from the engine enter the closed chamber in the box-like portion 51 through the inlet opening 68 and, due to the location of the baffles 72,74 and the blocking plate 76, are forced to follow a path toward one end of the closed chamber. As the gases move in that direction, they exit either through the opening at the end of the baffle plates 72,74 or through the plurality of openings 78 in the remote end portion of the baffle plates. The exhaust gases are then diverted back in the opposite direction along the outer surfaces of the baffles 72,74 until they enter the outlet opening 70 at the base of the exhaust stack. The gases then travel up the exhaust stack and are propelled out the exit of the stack rearward of the vehicle. Since the exhaust gases frequently contain moisture, the small drain openings 80 are provided in the lower extremity of the closed chamber so as to permit the moisture and condensate to exit from the chamber.

Due to the relative heavy gauge of the plates forming the box-like portion 51 of the turn-stop assembly 24, the noises from the exhaust gases are muffled more effectively and the baffle plate arrangement further dissipates the noises prior to discharge of the exhaust gases from the exhaust stack. The heavy gauge of the plates of the portion 51 also has the advantage that the corrosive nature of the exhaust gases will corrode less rapidly through the walls of the box-like portion as compared to the conventional muffler arrangement. The heat in the exhaust gases will be radiated through the plates of the box-like portion 51 and, due to the open exposure of the exterior of the box-like portion, the heat will be readily dissipated to the atmosphere.

I claim:

1. In an exhaust system for an engine of a tractor-trailer vehicle having a turn-stop assembly mounted on the frame of said vehicle rearward of the cab of said vehicle, said turn-stop assembly having a closed chamber, an inlet opening into said chamber, means for conveying exhaust gases from said engine into said chamber through said inlet opening, baffle means in said chamber on opposite sides of said inlet opening, an exhaust stack communicating with the inside of said chamber, and means for blocking the shortest path of said exhaust gases from said inlet to said exhaust stack, whereby exhaust gases from said engine enter said closed chamber and is muffled and dispersed by said baffle means before being discharged from said exhaust stack.

2. The exhaust system of claim 1 wherein said baffle means are plates which have plural apertures formed therethrough for the partial passage of some of said exhaust gases.

3. The exhaust system of claim 1 wherein said exhaust stack extends upwardly from said turn-stop assembly and expells the exhaust in a direction away from the cab of said vehicle.

4. The exhaust system of claim 1 wherein said chamber has at least one small drainage opening at a lower extremity thereof through which condensate from said exhaust gases is discharged.

5. The exhaust system of claim 1 wherein said means for blocking the shortest path is a blocking plate extending between said baffle means and closes off the most direct path between said inlet and said exhaust stack.

6. The exhaust system of claim 1 wherein said turn-stop assembly has a pair of leg portions removably secured to the frame of said vehicle, and said closed chamber is carried by said leg portions and includes a front and back wall, a top wall, a bottom wall and a pair of vertically oriented bumpers connected together to form said closed chamber.

7. An exhaust system for an engine of a tractor-trailer vehicle, a turn-stop assembly carried by the frame of said vehicle rearward of the cab of said vehicle, said turn-stop assembly having an enlarged box-like portion forming a closed chamber with an inlet opening and an outlet opening, a pair of baffle plates mounted in said closed chamber on opposite sides of said inlet opening, an exhaust stack extending upwardly from said box-like portion and communicating with the inside of said closed chamber through said outlet opening, means for transmitting the exhaust gases from said engine into said closed chamber through said inlet opening, whereby exhaust gases from said engine enter said closed chamber and are diverted by said baffle means before discharge from said exhaust stack.

8. In an exhaust system as claimed in claim 7 wherein a barrier plate extends between said baffle plates for diverting said exhaust gases in said chamber initially away from said exhaust stack.

9. In an exhaust system as claimed in claim 8 wherein said baffle plates have apertures therethrough for passage of some of said exhaust gases.

10. In an exhaust system for an engine of a tractor-trailer vehicle, a turn-stop assembly carried by the frame of said vehicle rearward of the cab of said vehicle, said turn-stop assembly having an enlarged box-like portion forming a closed chamber, an inlet opening into said chamber, an exhaust pipe connected to the exhaust manifold of said engine and communicating with said chamber through said inlet opening, baffle plates mounted in said chamber above and below said inlet opening, apertures formed in a portion of each of said baffle plates, an exhaust stack extending upwardly from said box-like section and communicating with the inside of said closed chamber, a blocking plate extending between the baffle plates and being located on the side of the inlet opening closest to the exhaust stack so as to force the exhaust gases to follow a longer path to said exhaust stack, and at least one drain opening at a lower extremity of said closed chamber for draining condensate from said closed chamber, whereby exhaust gases from said engine enter said closed chamber and are baffled through and around said baffle plates before being discharged from said exhaust stack.

* * * * *